April 24, 1951 K. CLARK 2,549,756
DOMESTIC APPLIANCE
Filed Feb. 23, 1945 3 Sheets-Sheet 1

INVENTOR.
KENDALL CLARK
BY

April 24, 1951     K. CLARK     2,549,756
DOMESTIC APPLIANCE

Filed Feb. 23, 1945     3 Sheets-Sheet 3

INVENTOR.
KENDALL CLARK
BY
Spencer Hardman & John
Attorneys

Patented Apr. 24, 1951

2,549,756

UNITED STATES PATENT OFFICE 2,549,756

DOMESTIC APPLIANCE

Kendall Clark, Oakwood, Ohio, assignor to General Motors Corporation, Dayton, Ohio, a corporation of Delaware Application February 23, 1945, Serial No. 579,415

7 Claims. (Cl. 74—573)

This invention relates to domestic appliances and more particularly to the counterbalancing of rotatable receptacles, such as are used in automatic washing machines.

An object of this invention is to provide for the counterbalancing of a rotatable receptacle by a liquid which is maintained in substantial radial symmetry with respect to the rotary shaft of the receptacle while the receptacle accelerates below its critical speed, and by displacing the liquid eccentrically in counterbalancing relationship with respect to any unbalanced load in the receptacle when the receptacle rotates above its critical speed.

Further objects and advantages of the present invention will be apparent from the following description, reference being had to the accompanying drawings, wherein a preferred form of the present invention is clearly shown.

Figure 1:
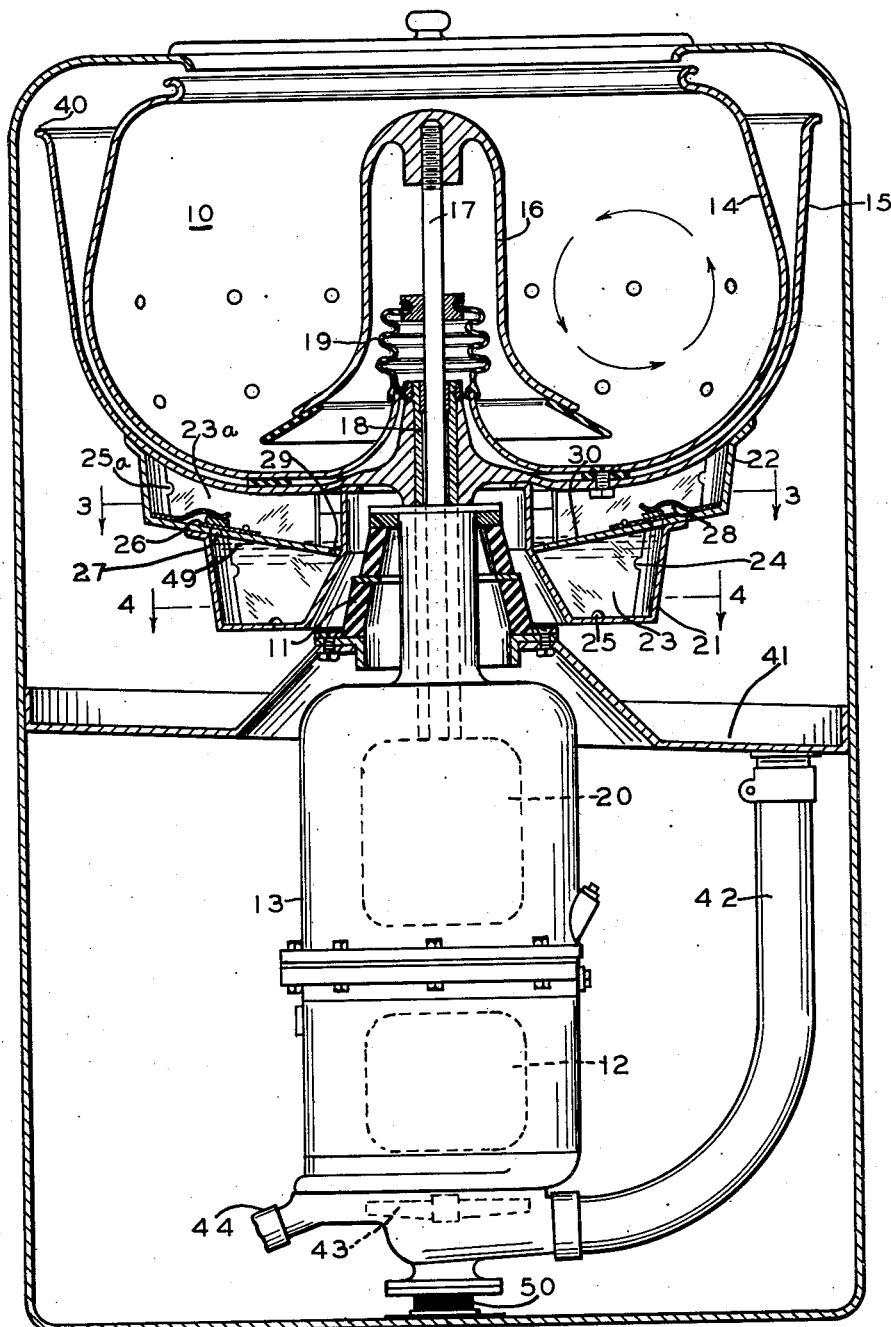
Fig. 1 is a vertical cross-section of a washing machine embodying features of my invention.
Figure 2:
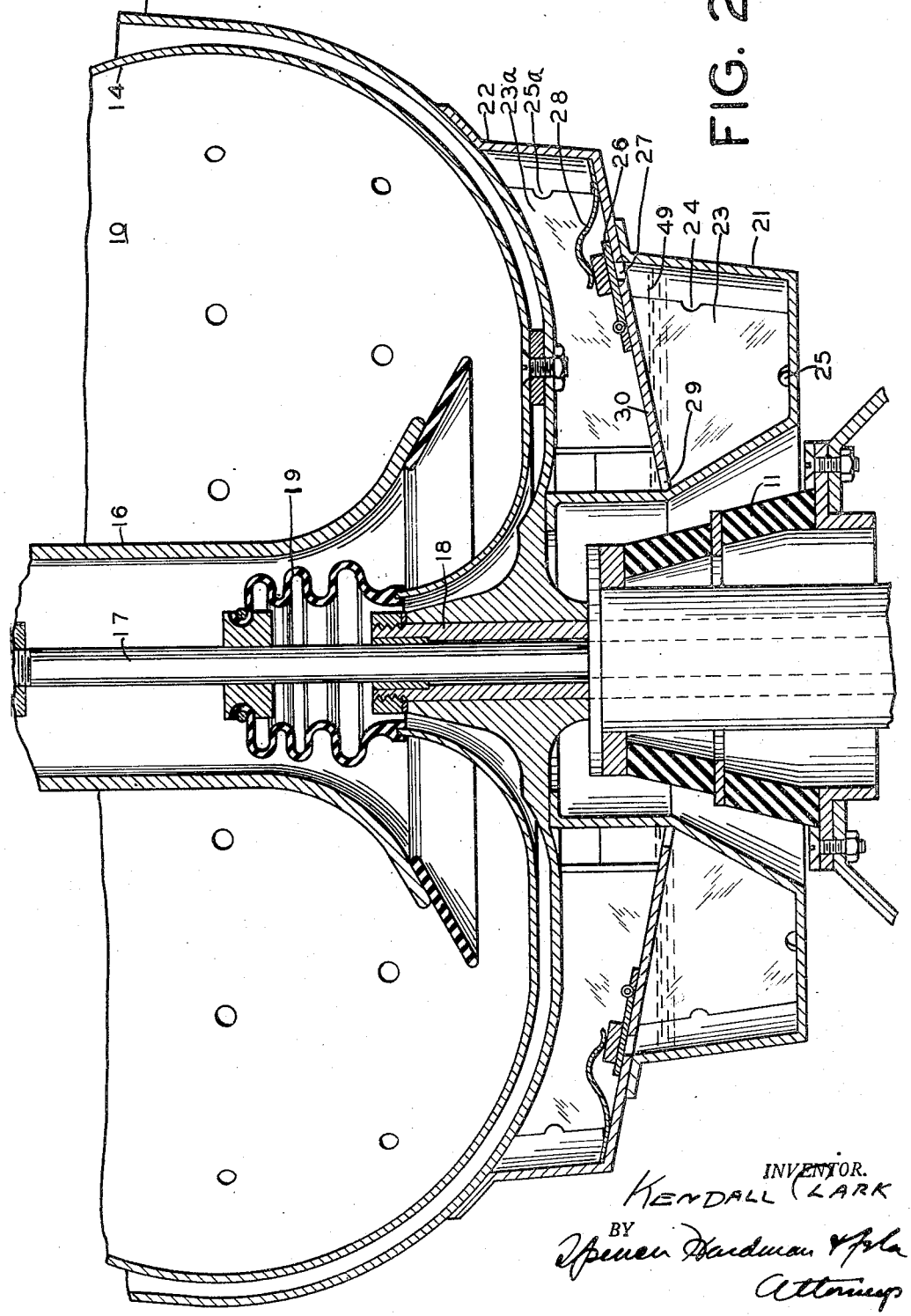
Fig. 2 is an enlarged cross-section of a portion of Fig. 1.
Figure 3:
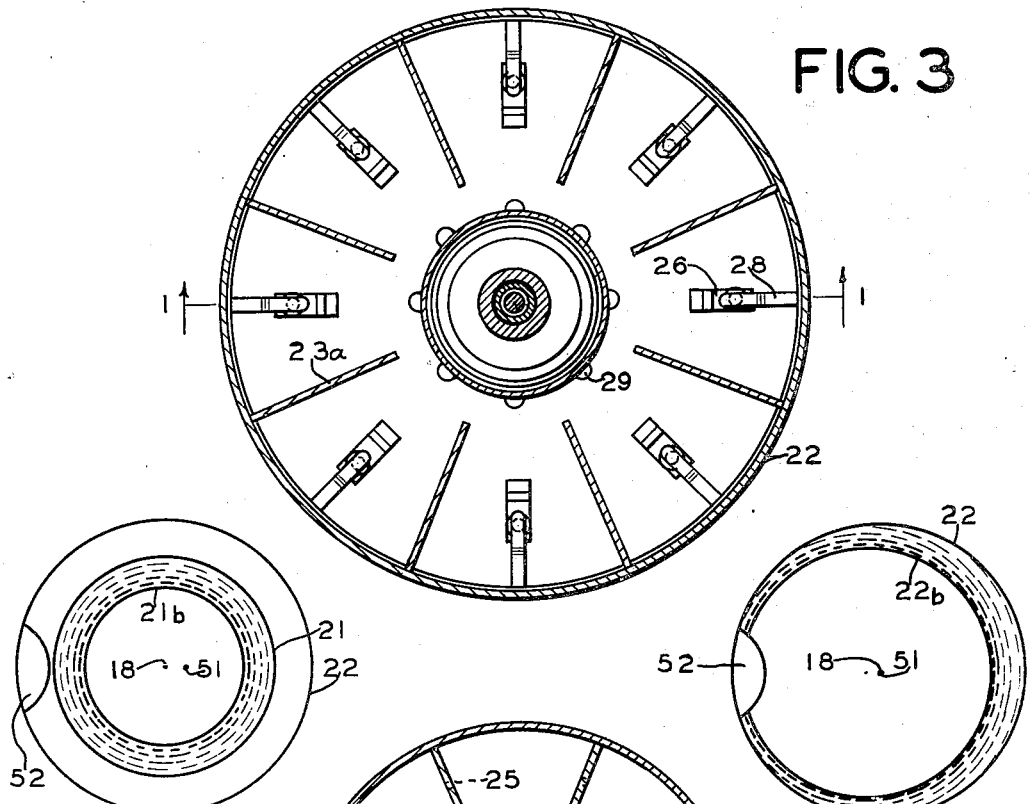
Fig. 3 is a cross-section taken along the line 3—3 of Fig. 1.

According to my invention a rotatable receptacle 10 is mounted to rotate on a flexible support or collar 11, being driven by a motor 12 within a casing 13, which casing 13 is also mounted on the support 11. Preferably the receptacle 10 includes an inner basket 14 and an outer imperforate tub 15 secured together. An agitator 16 is vertically reciprocated within the receptacle 10 by means of a vertically reciprocable shaft 17. The receptacle 10 is fixed on a rotatable sleeve 18, which surrounds the shaft 17. A bellows 19 is hermetically secured to the shaft 17 and receptacle 10, as indicated, to prevent flow of liquid into the casing 13.

The motor drives the receptacle 10 and agitator 16 through the medium of a transmission 20 which may be selectively arranged to rotate the receptacle 10 with the agitator 16, or to reciprocate the agitator 16 vertically while the receptacle is maintained stationary. Merely by way of example, the foregoing elements may be substantially the same as disclosed in my Patent No. 2,366,236, granted January 2, 1945.

When the motor 12 rotates the receptacle 10, it accelerates the receptacle through and above the critical speed of rotation which is established by the period of vibration of the mechanism on the support 11.

A counterbalancing liquid is caused to rotate with the receptacle in substantial radial symmetry with respect to the rotational shaft or sleeve 18 while the receptacle accelerates below the critical speed and is displaced to rotate eccentrically in counterbalancing relationship with respect to any unbalanced load in the receptacle 10 when the receptacle 10 rotates above the critical speed. To this end, a lower container 21, and an upper container 22 are secured to the receptacle 10 to rotate therewith. These containers are so arranged, that the counterbalancing liquid is maintained in the lower container 21 in substantial radial symmetry to the shaft 18 below the critical speed, and is discharged into the upper container 22 above the critical speed and is there free to arrange itself eccentrically with respect to the shaft 18 to counterbalance any unbalanced load. A plurality of baffles 23 are disposed radially within the lower container 22, and these are provided with relatively small orifices 24 and 25, which permit the counterbalancing liquid to distribute itself equally within the container 21; but at a very slow rate, so that the liquid cannot quickly distribute itself eccentrically within the container while the receptacle 10 accelerates up to the critical speed. In addition, the container 21 is filled with a sufficient quantity of liquid, to the level indicated by the line 49, so that there is not enough room in the container 21 for the liquid to arranged itself eccentrically to any substantial degree. The upper container 22 is also provided with baffles 23a arranged radially therein, and these baffles are provided with orifices 25a, which allow the liquid to flow slowly past the baffles, so that the liquid can distribute itself as desired. The upper container 22 is of sufficient volumetric capacity so that the liquid may arrange itself eccentrically in counterbalancing relation to the unbalanced load.

Means are provided for maintaining the liquid in the lower container 21 below critical speed and for discharging some or all of the liquid into the upper container 22 above critical speed in such a manner that the liquid can distribute itself eccentrically in counterbalancing relation to the unbalanced load. To this end, a plurality of valves 26 are provided above orifices 27 near the outer periphery of the container 21. Leaf springs 28 maintain the valves closed below critical speed; but yield and allow the valves to open above critical speed, due to the increased pressure of the liquid below the valves. The strength of the springs 28 is so calibrated that the valves open above critical speed, but remain closed below critical speed. Openings 29 are placed nearer the center of the container 22, between the containers 21 and 22. The bottom 30 of the upper container 22 is sloped downwardly towards the central axis, so that the liquid can flow through the orifices 29 from the upper container 22 to the lower container 21 when the receptacle 10 is stopped.

A snubber 50 may be placed at the bottom of casing 13 substantially as disclosed in my Patent 2,366,236.

Figures 4, 5, 6:
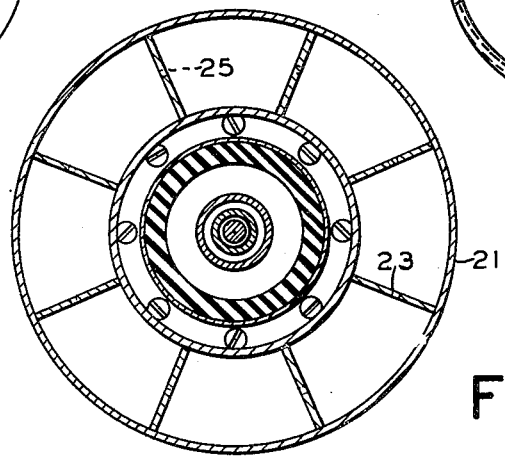
Fig. 4 is a cross-section taken along the line 4—4 of Fig. 1.
Fig. 5 is a diagrammatic representation, at a reduced scale, showing the disposition of liquid and axis of rotation below critical speed.
Fig. 6 is a view similar to Fig. 5, but showing disposition of liquid above critical speed.

In the modifications shown in Figs. 1 through 6, clothes and liquid are placed in the receptacle 10 substantially as disclosed in my said patent, and the agitator 16 is vertically reciprocated for a sufficient length of time to wash the clothes. Thereafter, by a timer control, not shown, the transmission 20 is controlled to maintain the agitator 16 stationary and to rotate the receptacle 10. This rotation is an accelerating one until a maximum speed is attained above the critical speed of the machine. The washing liquid is discharged over the rim 40 into the sump 41 and from thence through the hose 42 and is pumped by the pump 43 through the discharge hose 44 to a suitable drain. During this time the receptacle 10 is accelerating through and above the critical speed. While it rotates below the critical speed, the valves 26 are maintained in closed position. The volumetric relationship between the liquid in container 21 and the volumetric capacity of container 21 is such that the counterbalancing liquid is maintained in substantial radial symmetry with respect to the shaft 18, as indicated in Fig. 5. When acceleration passes above critical speed, the valves 28 open, and allow the liquid to flow by centrifugal action to the upper container 22, where the volumetric capacity is such that the counterbalancing liquid arranges itself eccentrically and in counterbalancing relationship with respect to any unbalanced load. The liquid may be all in container 22, or may be partly in container 22 and partly in container 21 above critical speed.

In a centrifugal machine of this character, the unbalanced load, or heavy side of the receptacle 10, rotates on the same side with the shaft 18 with respect to the axis of rotation below critical speed. If the counterbalancing liquid were also free to distribute itself eccentrically below critical speed, it would also distribute itself on the same side as the unbalanced load or heavy side, and would therefore aggravate the displacement of the rotational shaft 18 below critical speed. For this reason, I have provided the means heretofore described for maintaining the counterbalancing liquid in radial symmetry below critical speed. As the receptacle 10 rotates above critical speed, the unbalanced load, or heavy side, places itself opposite the shaft 18 with respect to the axis of rotation, and, if the counterbalancing liquid is freed above critical speed, it displaces itself eccentrically opposite to the unbalanced load or heavy side, and tends to bring the axis of rotation into approximate coincidence with the rotational shaft 18 of the machine.

Figure 7:
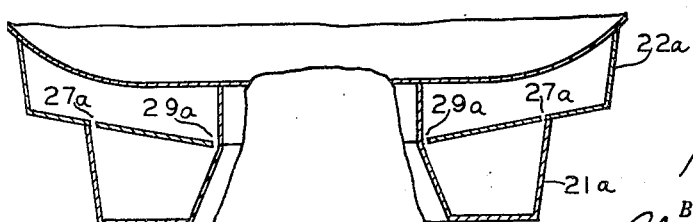
Fig. 7 is a diagrammatic vertical cross-section of a modified form of the invention.

In the modification shown in Fig. 7, the lower container 21a and upper container 22a are substantially the same as the containers 21 and 22 heretofore described. Orifices 27a are provided substantially in the same position as orifices 27; but they are of such small size that no substantial amount of liquid can flow up through them while the receptacle 10 accelerates up to critical speed. The small amount of liquid which passes through them during this time is relatively small. However, as the receptacle accelerates above critical speed, the counterbalancing liquid flows through the orifices 27a in sufficient quantity, so that the counterbalancing liquid can distribute itself eccentrically to properly counterbalance the machine. Otherwise, the modification shown in Fig. 7 may be identical with the modification shown in Figs. 1 to 6.

In Fig. 5 the circles 21 and 22 are diagrammatic representations of containers 21 and 22. The circle 21b indicates the inner surface of the counterbalancing liquid, which is maintained symmetrical with respect to the shaft 18. In Fig. 6, the circle 22 is a diagrammatic representation of container 22 and the curve 22b represents the inner surface of the counterbalancing liquid, which has now been distributed eccentrically to counterbalance the unbalanced load. The axis of rotation is indicated by the dot 51, while the unbalanced load is represented at 52.

While the form of embodiment of the invention as herein disclosed, constitutes a preferred form, it is to be understood that other forms might be adopted, as may come within the scope of the claims which follow.

What is claimed is as follows:

1. In a centrifugal machine, a receptacle adapted to have an unbalanced load and rotatable about a shaft axis, a support upon which said receptacle has a critical speed of rotation, drive means to rotatably accelerate said receptacle through and above said critical speed, counterbalancing liquid containing means containing counterbalancing liquid independent of the contents of said receptacle and rotatable with said receptacle, said liquid containing means including a below critical speed liquid first container having means maintaining said liquid in concentric rotation to said shaft axis and an above critical speed liquid second container releasing said liquid for rotation eccentric to said shaft axis, and a flow control construction between said containers having means to retain said liquid in said first container while said receptacle rotates below critical speed and to release said liquid into said second container for substantially unrestrained eccentric distribution in said second container when said receptacle has been accelerated beyond said critical speed.

2. In a centrifugal machine a receptacle adapted to have an unbalanced load and rotatable about a shaft axis, a support upon which said receptacle has a critical speed of rotation, drive means to rotatably accelerate said receptacle through and above said critical speed, counterbalancing liquid containing means rotatable with said receptacle and containing a counterbalancing liquid independent of the contents of said receptacle, said means including a lower container having means to maintain said liquid in substantial radial symmetry with respect to said rotational shaft while said receptacle accelerates below said critical speed, an upper container into which said lower container discharges centrifugally and in which said liquid is free to distribute itself eccentrically opposite said unbalanced load, and means to release said liquid from said lower container to said upper container when said receptacle has accelerated above said critical speed.

3. In a centrifugal machine, a receptacle adapted to have an unbalanced load and rotatable about a shaft axis, a support upon which said receptacle has a critical speed of rotation, drive means to rotatably accelerate said receptacle through and above said critical speed, counterbalancing liquid containing means rotatable with said receptacle, said means including a lower container having means to maintain said liquid in substantial radial symmetry with respect to said rotational shaft while said receptacle accelerates below said critical speed, an upper container into which said lower container discharges centrifugally and in which said liquid is free to distribute itself eccentrically opposite said unbalanced load, valve means to release said liquid from said lower container to said upper container, and means governing said valve means to maintain said valve means closed during acceleration below said critical speed and to open said valve means above said critical speed.

4. In a centrifugal machine, a flexible support, a receptacle rotatable on said support and having a critical speed, drive means connected to said receptacle to accelerate said receptacle through and above said critical speed, a first container rotatable by said drive means and connected to impart its centrifugal reaction to said receptacle and containing counterbalancing liquid independent of the contents of said receptacle and having means to restrain circumferential displacement of said liquid in said container below said critical speed, a second container rotatable by said drive means and connected to impart its centrifugal reaction to said receptacle and in which said liquid is free to distribute itself eccentrically, and means to prevent substantial discharge of liquid from said first container to said second container while said receptacle accelerates below said critical speed and to allow substantial discharge of said liquid to said second container above said critical speed.

5. In a centrifugal machine, a receptacle adapted to have an unbalanced load and rotatable about a shaft axis, a support upon which said receptacle has a critical speed of rotation, drive means to rotatably accelerate said receptacle through and above said critical speed, counterbalancing liquid retaining means rotatable with said receptacle and having means to maintain said liquid in substantial radial symmetry with respect to said rotational shaft while said receptacle is being accelerated substantially to its critical speed, a container to receive and maintain liquid in eccentric relation to said shaft axis and valve means effective substantially at critical speed to release said liquid for substantially unrestrained eccentric distribution into said container when said receptacle has been accelerated beyond said critical speed.

6. In a centrifugal machine, a receptacle mounted to rotate about a shaft axis and which is adapted to have an unbalanced load and which is rotatably accelerated about said shaft axis through and above a critical speed, which receptacle is provided with a first container for a counterbalancing liquid independent of the contents of said receptacle, said liquid being maintained in said container in substantial radial symmetry and in centrifugal reaction with respect to rotational shaft axis while said receptacle is being accelerated substantially to its critical speed, said receptacle also having a second container adapted to receive said liquid from said first container for rotation and distribution in said second container in substantial counterbalancing relationship and reaction with respect to said unbalanced load, and valvular means for releasing said counterbalancing liquid from said first container to said second container when said receptacle is accelerated above said critical speed.

7. In a centrifugal machine a receptacle mounted to rotate about a shaft axis and which is adapted to have an unbalanced load and which is rotatably accelerated about said shaft axis through and above a critical speed, which receptacle is provided with a first container for a counterbalancing liquid independent of the contents of said receptacle, said liquid being maintained in said container in substantial radial symmetry and in centrifugal reaction with respect to rotational shaft axis while said receptacle is being accelerated substantially to its critical speed, said receptacle also having a second container adapted to receive said liquid from said first container for rotation and distribution in said second container in substantial counterbalancing relationship and reaction with respect to said unbalanced load, and valvular means for preventing the release of said counterbalancing liquid from said first container to said second container until said receptacle is accelerated above critical speed.

KENDALL CLARK.

REFERENCES CITED

The following references are of record in the file of this patent:

UNITED STATES PATENTS

| Number | Name | Date |
| --- | --- | --- |
| 1,209,730 | Lablanc | Dec. 26, 1916 |
| 1,521,858 | Bock | Jan. 6, 1925 |
| 1,854,621 | Orr | Apr. 19, 1932 |
| 2,224,241 | Verdier et al. | Dec. 10, 1940 |
| 2,375,635 | Dyer | May 8, 1945 |